United States Patent
Mansell et al.

(10) Patent No.: US 6,493,123 B1
(45) Date of Patent: Dec. 10, 2002

(54) MODULATED-RETROREFLECTOR BASED OPTICAL IDENTIFICATION SYSTEM

(75) Inventors: Dennis Neal Mansell, Albuquerque, NM (US); Peter Samuel Durkin, Albuquerque, NM (US); Gregory Newton Whitfield, Albuquerque, NM (US); David Wayne Morley, Santa Fe, NM (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 09/427,830

(22) Filed: Oct. 27, 1999

(51) Int. Cl.[7] .............................................. H04B 10/00
(52) U.S. Cl. ......................... 359/169; 359/170; 342/45
(58) Field of Search ................................. 359/169–170; 342/45, 54–55; 340/901, 942

(56) References Cited

U.S. PATENT DOCUMENTS

| | | | |
|---|---|---|---|
| 3,527,949 A | 9/1970 | Huth et al. | 250/199 |
| 3,727,061 A | 4/1973 | Dworkin | 250/199 |
| 3,989,942 A | 11/1976 | Waddoups | 250/199 |
| 4,731,878 A | 3/1988 | Sepp et al. | 455/605 |
| 4,983,021 A | 1/1991 | Fergason | 350/332 |
| 4,995,101 A | 2/1991 | Titterton et al. | 455/607 |
| 5,355,241 A | 10/1994 | Kelly | 359/170 |
| 5,375,008 A | 12/1994 | Guerreri | 359/169 |
| 5,459,470 A | 10/1995 | Wootton et al. | 342/45 |
| 5,485,301 A | 1/1996 | Miller | 359/181 |
| 5,801,866 A | 9/1998 | Chan et al. | 359/172 |

OTHER PUBLICATIONS

Swenson, Charles M. and Gary L. Jensen. "Low–Power Optical Transceiver for low Earth Orbit", SPIE vol. 2553. Jul. 14, 1995.

Swenson, Charles M. and Clark A. Steed. Low Power FLC–based Retromodulator Communications System. SPIE vol. 2990, Feb. 14, 1997.

*Primary Examiner*—Kinfe-Michael Negash
(74) *Attorney, Agent, or Firm*—Stetina Brunda Garred & Brucker

(57) ABSTRACT

An optical identification system for identifying a vehicle. The system comprises a laser source for generating a transmitted beam and a reflector in optical communication therewith. The reflector is operative to reflect the transmitted beam to thereby generate a reflected beam. The system further includes a shutter in optical communication with the reflected beam and operative to modulate the polarization of the reflected beam with identification information thereby generating a modulated reflected beam. The optical identification system of the present invention further includes a detector in optical communication with the modulated reflected beam. The detector is operative to pass the modulated reflected beam and decode the identification information modulated thereon.

34 Claims, 2 Drawing Sheets

MODULATED-RETROREFLECTOR BASED OPTICAL IDENTIFICATION SYSTEM

CROSS-REFERENCE TO RELATED APPLICATIONS (Not Applicable)

STATEMENT RE: FEDERALLY SPONSORED RESEARCH/DEVELOPMENT (Not Applicable)

BACKGROUND OF THE INVENTION

The present invention generally relates to identification systems and more particularly to an optical identification system that has a low probability of being intercepted.

Military operations frequently require location and identification of friendly personnel or vehicles over line-of-sight ranges of a few miles. Typically, a field commander will want to visually identify units to determine their position in the field. By knowing the exact position of the units in the field, the field commander can move his personnel and vehicles into an optimum position.

Determining the position of personnel and vehicles in the field can be difficult due to battlefield conditions. Personnel and vehicles may be camouflaged such that a visual identification may be difficult. Additionally, personnel and vehicles may be turned away from the battlefield commander such that markings on the vehicle cannot be seen and a positive identification cannot be made.

In prior art identification systems, the battlefield commander has used a radio to interrogate field units and determine their positions. However, this method could lead to detection by enemy units through radio direction finding techniques. Alternatively, even if the enemy cannot determine the exact location of the battlefield units, the enemy will still be informed of the units presence through their radio communications. Therefore, radio identification of battlefield units is not desirable because it is susceptible to interception by the enemy.

Prior art optical identification systems have relied upon a laser beam for interrogation of units. In such systems, the battlefield commander will direct a laser beam from a transmitter onto a target located on the desired unit. The target will respond by transmitting its own laser back to a receiver whereby information contained within the laser beam about the identification of the unit will be decoded. Alternatively, the target may modify the transmitted beam and return the modified beam to the battlefield commander whereby the modified beam will be decoded in order to determine the identification of the unit. A problem associated with the prior art laser identification systems is that the systems are bulky and highly complex. In this respect, the transmitter and target are highly complex and prone to failure. Additionally, the lasers used in the prior art systems are bulky and consume large amounts of power thereby needing to be cooled and making it difficult to implement a portable system for the battlefield. Further, a problem associated with the prior art optical identification systems is that the laser beam is subject to divergence and scattering thereby allowing such systems to be vulnerable to detection and jamming by the enemy.

The present invention addresses the problems associated with the prior art identification systems by providing a system that provides covert identification of units on the battlefield. In this respect, the present invention provides an optical identification system that is easily transportable and consumes a low amount of power. Further, the present invention provides a laser based optical identification system that is extremely difficult to detect and jam.

BRIEF SUMMARY OF THE INVENTION

An optical identification system for identifying a vehicle. The system comprises a laser source for generating a transmitted beam and a reflector in optical communication therewith. The reflector is operative to reflect the transmitted beam to thereby generate a reflected beam. The system further includes a shutter in optical communication with the reflected beam and operative to modulate the polarization of the reflected beam with identification information to thereby generate a modulated reflected beam. The optical identification system further includes a detector in optical communication with the reflected beam. The detector is operative to pass the modulated reflected beam and decode the identification information modulated thereon.

In the preferred embodiment of the present invention, the detector of the optical identification system will include a polarizer to pass the correct polarization of the reflected beam. The polarizer is configured to pass the modulated reflected beam when the polarization of the modulated reflected beam matches the polarization modulated by the shutter. The detector of the optical identification system further includes an optical filter that is operative to only pass the modulated reflected beam when the wavelength thereof matches the wavelength of the transmitted beam.

Typically, the laser source and the detector will be mounted on a common platform such as a pair of binoculars to form a sighting device. The laser is a low power (20 mW) eye safe laser that emits light having a wavelength of about 1.55 μm.

The shutter and the reflector of the present invention will be mounted as a target upon the vehicle to be identified. In this respect, the shutter will be an electronically driven liquid crystal that modulates the reflected beam by rotating the polarization thereof. Typically, the shutter will modulate the polarization with a prescribed code that is the identification information. In the preferred embodiment of the present invention, the identification information corresponds to the identity of the vehicle. The reflector is typically a corner cube operative to reflect the transmitted beam back to the source. The shutter will be mounted in front of the corner cube such that the transmitted beam must pass through the shutter before striking the reflector.

The detector of the present invention is a photodetector operative to convert the modulated reflected beam into an electrical signal. The detector is configured to decode the modulated reflected beam to determine the identification information.

In accordance with the present invention, there is Provided a method of optical identification with a laser source, a shutter, a reflector, a polarizer and a detector. The method comprises generating a transmitted beam with the laser source. Next, the transmitted beam is reflected with the reflector to generate a reflected beam. The polarization of the reflected beam is modulated with identification information by the shutter to thereby generate a modulated reflected beam. The modulated reflected beam is passed by the polarizer when the polarization of the modulated reflected beam matches the polarization modulated by the shutter. The modulated reflected beam is decoded with the detector to determine the identification information. Typically, the reflector and the shutter are mounted on a vehicle and the identification information modulated on the reflected beam corresponds to an identification code of the vehicle.

BRIEF DESCRIPTION OF THE DRAWINGS

These as well as other features of the present invention will become more apparent upon reference to the drawings wherein.

DETAILED DESCRIPTION OF THE INVENTION

Figure 1:
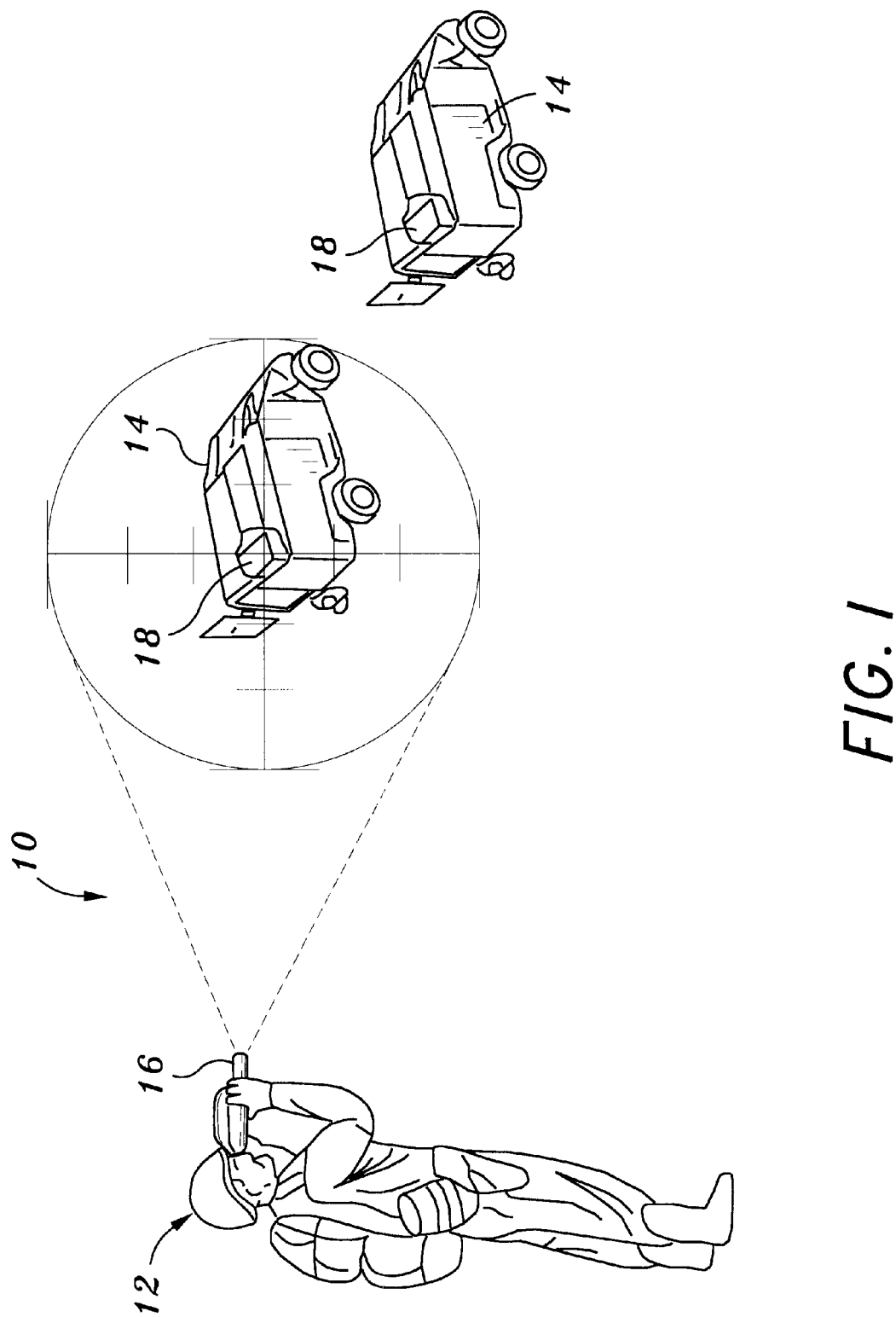
FIG. 1 perspectively illustrates an optical identification system constructed in accordance with a preferred embodiment of the present invention.

Referring now to the drawings wherein the showings are for purposes of illustrating a preferred embodiment of the present invention only, and not for purposes of limiting the same, FIG. 1 perspectively illustrates an optical identification system 10 used by a soldier 12 to identify a vehicle 14. The optical identification system 10 comprises a sighting unit 16 used to locate a target 18 mounted on the vehicle 14. As seen in FIG. 1, the soldier 12 uses an ocular of the sighting unit 16 to identify the target 18 on the vehicle 14.

Figure 2:
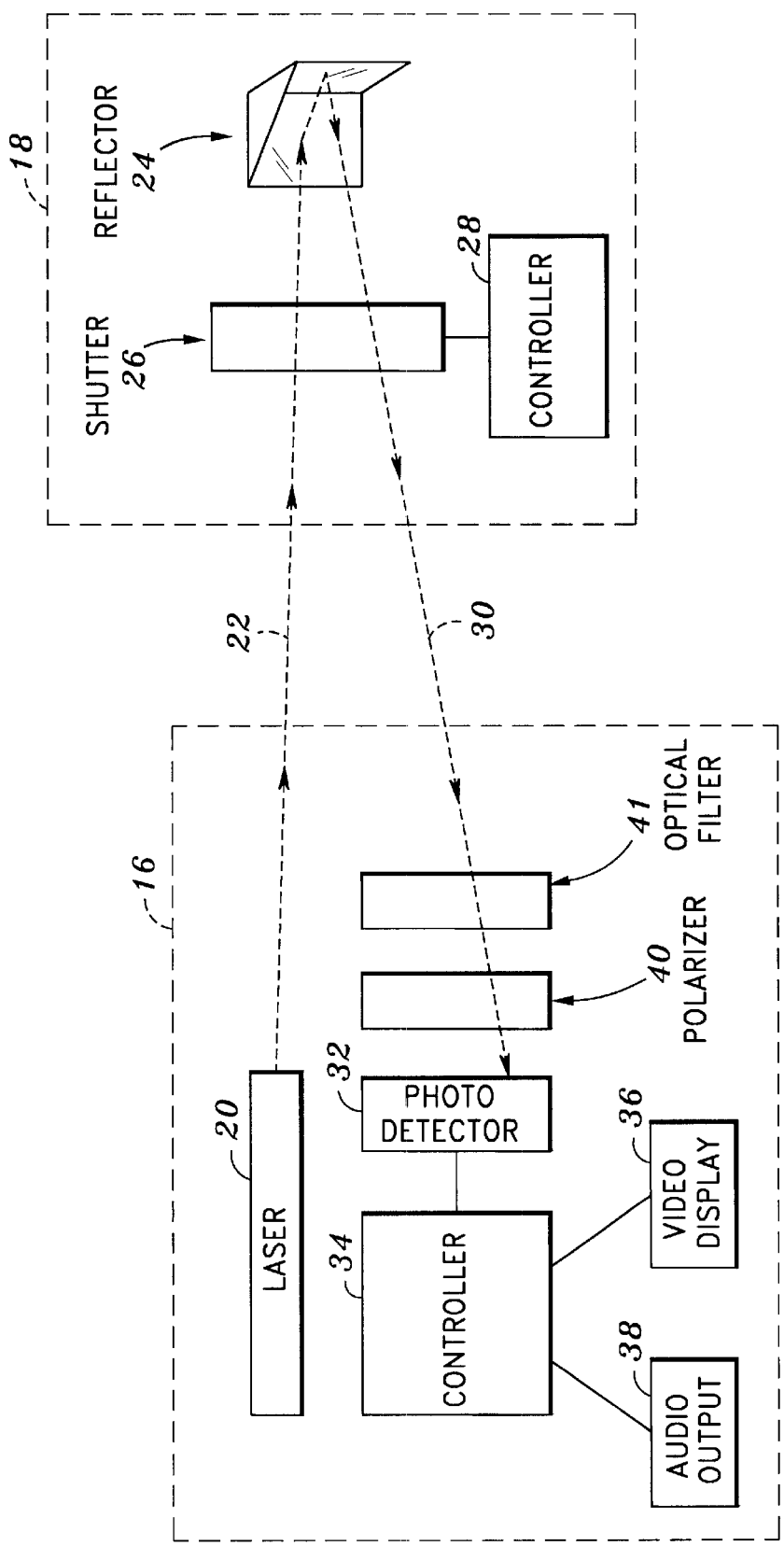
FIG. 2 is a block level diagram of the optical identification system shown in FIG. 1.

Referring to FIG. 2, the sighting unit 16 includes a laser 20 for generating a transmitted laser beam 22. The laser 20 is co-aligned with the ocular of the sighting unit such that as the soldier 12 sights the target 18 with the ocular, the laser 20 will direct the laser beam 22 toward the target 18. In the preferred embodiment of the present invention, the laser 20 is a low power 20-mW continuous wave diode laser. The laser 20 operates in the near infrared and produces a wavelength of approximately 1.55 $\mu$m. Accordingly, the laser 20 is entirely eye safe and is outside the passband of many deployed military infrared systems. The laser 20 does not require any cooling and/or temperature control thereby allowing the laser 20 to be easily transportable. A single lens (not shown) is placed in front of the laser 20, in order to collimate the transmitted laser beam 22.

As previously mentioned above, the laser 20 transmits the transmitted laser beam 22 to the target 18 mounted on the vehicle 14. The target 18 includes a reflector 24 that is operative to reflect the transmitted laser beam 22. In the preferred embodiment of the present invention, the reflector 24 is a corner cube having three mirrored surfaces each at 90 degrees to one another (i.e., similar to a corner of a room). The reflector 24 is operative to precisely reflect the transmitted laser beam 22 back to the sighting unit 16. In this respect, the reflector 24 reflects the transmitted laser beam 22 precisely back in the direction of transmission. Any beam reflected by the reflector 24 is not affected by the relative angle or motion of the reflector 24 within a cone of approximately 45 degrees. Therefore, the reflector 24 does not scatter the transmitted laser beam 22 after reflection. Those of ordinary skill in the art will recognize that the reflector 24 may be a planar reflective surface or have other configurations such that the transmitted laser beam 22 is precisely reflected back to the sighting unit 16.

In accordance with the preferred embodiment of the present invention, the target 18 includes a shutter 26 disposed in the optical path of the transmitted laser beam 22. In this respect, the shutter 26 is disposed between the laser 20 and the reflector 24 such that the transmitted laser beam 22 must pass therethrough before striking the reflector 24. The shutter 26 is an electrically driven liquid crystal operated by a small electronic shutter controller 28. The shutter controller 28 is powered by a battery and consumes a minimal amount of power. In the preferred embodiment of the present invention, the shutter 26 is a flat window-like liquid crystal structure that rotates the polarization of the transmitted beam 22 depending on the voltage applied to it. The shutter controller 28 is operative to apply a voltage to the shutter 26 such that the shutter 26 can rotate the polarization of any beam transmitted therethrough. As the transmitted beam 22 strikes the reflector 24 and is returned as reflected beam 30, the polarization of the reflected beam 30 may be rotated a total of 90 degrees by the shutter 26 depending on the voltage applied thereto by shutter controller 28. The shutter controller 28 applies a voltage to the shutter 26 in a manner that will modulate the reflected beam's 30 polarization with a prescribed code or pattern. The shutter 26 operates in a continuous, closed loop mode by the shutter controller 28 such that the code applied to shutter 26 is repeated.

As previously mentioned, the shutter 26 modulates the polarization of the reflected beam 30 with a prescribed code or pattern. The code or pattern can correspond to a binary representation of a number or name of the vehicle 14 that the target 18 is mounted upon. As will be recognized, the shutter controller 28 of each target 18 will operate a respective shutter 26 with a unique code such that the reflected beam 30 of each target 18 will be modulated with the unique code.

The reflected beam 30 is returned precisely to the sighting unit 16 by the reflector 24. As seen in FIG. 2, the sighting unit 16 includes a photodetector 32, an optical filter 41 and a polarizer 40 in optical communication with the reflected beam 30. The optical filter 41 will only pass light of a prescribed wavelength. Accordingly, the optical filter 41 will only pass light having a wavelength corresponding to the wavelength of light generated by the laser 20. In the preferred embodiment of the present invention, the optical filter 41 will pass the reflected beam 30 to the photodetector 32 if the light has a wavelength 1.55 $\mu$m corresponding to the wavelength of light generated by the laser source 20.

Similarly, the polarizer 40 will only pass light with a correct polarization. Specifically, the polarizer 40 will pass the reflected beam 30 if the light has the same polarization generated by the shutter 26. Therefore, the reflected beam 30 will pass to the photodetector 32 only when the shutter 26 has modulated the polarization of the reflected beam 30 to match the polarization of the polarizer 40. Therefore, a series of pulses of the reflected beam 30 with the same polarization as the polarizer 40 will strike the photodetector 32. If the polarization of the reflected beam 30 is crossed to the polarization as the polarizer 40 (i.e. the polarization of the reflected beam 30 has not been modulated by the shutter 26), then the reflected beam 30 will not pass through the polarizer 40 and will not strike the photodetector 32.

The photodetector 32 will detect the pulses of the reflected beam 30 and convert the same into an electrical signal that is passed onto the photodetector controller 34. The photodetector 32 is operative to detect the wavelength of the pulses of the reflected beam 30. In the preferred embodiment of the present invention, the photodetector 32 detects light having a wavelength of about 1.55 $\mu$m. The controller 34 is operative to decode the pulses of the reflected beam 30 in order to form the unique code from the target 18. The photodetector controller 34 is in electrical communication with a video display 36 and an audio output 38. In this respect, the photodetector controller 34 is operative to display the code from the target 18 and/or output an audio signal at audio output 38. Typically, the display 36 may be a LED display that displays a code word to the soldier 12. The audio output 38 may broadcast a recorded message to a pair of audio headsets worn by the soldier 12.

In the preferred mode of operation, the soldier 12 aims the sighting device 16 at the target 18 mounted on the vehicle 14. The laser 20 transmits the transmitted beam 22 to the target 18. The reflector 24 reflects the transmitted beam 22 to generate the reflected beam 30. The shutter 26 modulates the polarization of the reflected beam 30 with a code from the shutter controller 28. After the shutter 26 modulates the polarization of the reflected beam 30, the reflected beam is returned to the sighting unit 16. The reflected beam 30 is focused onto the photodetector 32 by the optical filter 41 and the polarizer 40 when the polarization and the wavelength of the reflected beam 30 are correct. The photodetector 32 detects the reflected beam 30 and decodes the identification information. The code is either visually presented on the display 36 and/or presented at audio output 38. The solder 12 can aim the sighting device 16 of the optical identification system 10 on multiple vehicles 14 on the battlefield to determine their identity.

The optical identification system 10 is ideally suited for battlefield applications because it offers little chance for interception of information during transfer. Specifically, the reflector 24 precisely reflects the reflected beam 30 to the photodetector 32. Tests with the optical identification system 10 constructed in accordance with the present invention have been performed and have proven that both the audio and visual codes can be transmitted over distances exceeding one mile.

In addition to using the optical identification system 10 to identify vehicles 14, the system 10 may be used as an interrogator to determine whether the vehicle 14 is friend or foe. Specifically, if the target 18 does not respond with the correct code, the soldier 12 then knows that the vehicle 14 is the enemy. Accordingly, the optical identification system 10 can be used to determine friendly forces such that fratricide can be reduced.

In addition to being used for ground-to-ground identification, the present invention can additionally be used in air-to-ground identification. The sighting unit 16 may be mounted on an aircraft with a stabilized platform (i.e., gimbals) to interrogate ground units having a target 18. Furthermore, with a powerful laser 20, air-to-air identification and satellite-to-air identification may be possible.

The present invention has application in other types of fields rather than just military operations. The optical identification system 10 may be used in civilian applications such as search and rescue operations, field level communications, unattended ground sensor data retrieval and communications to miniature unmanned aerial vehicles where weight and power consumption are important. Additionally, the target 18 may be used as a remote bar code generator for applications in which visibility over long distances is a limiting factor. Further, the target 18 of the optical identification system 10 is ideally suited for applications where standard RF communications present a safety hazard. It will be recognized by those of ordinary skill in the art that because the shutter 26 is electrically driven, it may be reprogrammed to transmit other coded messages such as emergency requests, inventory lists or even voice transmissions.

Additionally, it is contemplated that the shutter 26 may be equipped with a sensor for determining whether a transmitted beam 22 is being projected thereon. The beam 22 would be coded such that the shutter would only begin operating if the code of the beam 22 matches a prescribed code for the target 18. Accordingly, the target 18 would only create a modulated reflected beam 30 if the code of the transmitted beam 22 were correct thereby inhibiting detection from enemy forces.

Additional modifications and improvements of the present invention may also be apparent to those of ordinary skill in the art. Thus, the particular combination of parts described and illustrated herein is intended to represent only certain embodiments of the present invention, and is not intended to serve as limitations of alternative devices within the spirit and scope of the invention.

What is claimed is:

1. An optical identification system, comprising:
   a handheld sighting unit;
   a laser source disposed on the sighting unit for transmitting an unmodulated beam toward a vehicle;
   a reflector disposable upon a vehicle the reflector being operative to reflect the unmodulated beam to thereby generate a reflected beam;
   a shutter disposed on the reflector so that the reflected beam must pass through the shutter, the shutter being operative to modulate the polarization of the reflected beam with identification information to thereby generate a modulated reflected beam; and
   a detector disposed on the sighting unit, the detector being operative to pass the modulated reflected beam and decode the identification information modulated on the modulated reflected beam which passes through.

2. The optical identification system of claim 1 wherein the detector further comprises a polarizer and optical filter operative to pass the reflected beam with a prescribed polarization only.

3. The optical identification system of claim 2 wherein the polarizer is configured to pass the modulated reflected beam when the polarization of the modulated reflected beam matches the polarization modulated by the shutter.

4. The optical identification system of claim 3 wherein the detector comprises an optical filter operative to pass the modulated reflected beam.

5. The optical identification system of claim 4 wherein the optical filter is configured to pass the modulated reflected beam when the wavelength of the modulated reflected beam matches the wavelength of the unmodulated beam.

6. The optical identification system of claim 1 wherein the laser source, detector, and video display are mounted on a the hand held sighting unit in common.

7. The optical identification system of claim 6 wherein the common platform is a pair of binoculars.

8. The optical identification system of claim 1 wherein the shutter is a liquid crystal.

9. The optical identification system of claim 8 wherein the liquid crystal is electrically driven.

10. The optical identification system of claim 9 wherein the liquid crystal is configured to rotate the polarization of the reflected beam by varying a voltage applied thereto.

11. The optical identification system of claim 1 wherein the laser source is a low power eye-safe laser.

12. The optical identification system of claim 11 wherein the laser source is a 20 mW laser.

13. The optical identification system of claim 11 wherein the laser source has a wavelength of about 1.55 $\mu$m.

14. The optical identification system of claim 1 wherein the identification information modulated on the reflected beam is a prescribed code.

15. The optical identification system of claim 14 wherein the shutter and reflector are mounted on a vehicle and the prescribed code corresponds to an identity of the vehicle.

16. The optical identification system of claim 1 wherein the reflector comprises a corner cube operative to reflect the unmodulated beam.

17. The optical identification system of claim 16 wherein the shutter is mounted to the corner cube.

18. The optical identification system of claim 1 wherein the detector comprises a photodetector operative to convert the modulated reflected beam into an electrical signal.

19. The optical identification system of claim 1 wherein the detector is configured to decode the modulated reflected beam to determine the identification information.

20. A method of optical identification with a laser source, a shutter, a reflector, a polarizer and a detector, the method comprising the steps of:

a) generating a transmitted beam with the laser source;
   b) generating a reflected beam by reflecting the transmitted beam with the reflector;
   c) generating a modulated reflected beam with the shutter by modulating the polarization of the reflected beam, the shutter modulating the reflected beam with identification information;
   d) passing the modulated reflected beam to the detector with the polarizer when the polarization of the modulated reflected beam matches the polarization modulated by the shutter;
   e) decoding the modulated reflected beam passed by the polarizer with the detector to determine the identification information.

21. The method of claim 20 wherein step (c) comprises generating the modulated reflected beam by rotating the polarization thereof.

22. The method of claim 20 wherein step (c) comprises rotating the polarization of the reflected beam with a LCD shutter.

23. The method of claim 21 wherein step (d) further comprises passing the modulated reflected beam with an optical filter when the wavelength of the modulated reflected beam matches the wavelength of the transmitted beam.

24. The method of claim 20 wherein step (a) comprises generating a transmitted beam with a wavelength of about 1.55 $\mu$m.

25. The method of claim 20 wherein the shutter and the reflector are mounted on a vehicle and step (c) comprises modulating the polarization of the reflected beam with identification information corresponding to an identification code of the vehicle.

26. The method of claim 20 wherein step (b) comprises reflecting the transmitted laser beam with a corner cube.

27. The method of claim 20 wherein step (e) comprises decoding the modulated reflected-beam with a detector.

28. A hand held optical identification device, comprising:
   a hand held sighting unit;
   a laser source disposed on the sighting unit for transmitting an unmodulated beam toward an object of interest; and
   a detector disposed on the sighting unit, operative to receive or block a modulated beam reflected by the object of interest according to a modulation code thereof and decode identification information modulated on the modulated beam received thereby.

29. The hand held optical identification device of claim 28 wherein the modulated beam is modulated by means of rotating the beam's polarity.

30. The optical identification system of claim 1, further comprising a video displayed on the sighting unit, operative to display the identification information decoded by the detector.

31. The optical identification system of claim 28, further comprises a video display disposed on the sighting unit, operative to display the identification information decoded by the detector.

32. The optical identification system of claim 28, wherein the object of interest comprises a reflector operative to modulate the unmodulated beam into the modulated beam with the modulation code and reflect the modulated beam to the detector.

33. The optical identification system of claim 28, wherein the detector is operative to receive the modulated beam when the modulation code matches a prescribed code.

34. The optical identification system of claim 32, wherein the detector is operative to block the modulated beam with the modulation code is different from the prescribed code.

* * * * *